United States Patent
Yu et al.

(10) Patent No.: US 12,322,840 B2
(45) Date of Patent: Jun. 3, 2025

(54) SYSTEM AND METHOD FOR PREVENTING IRON FROM INFUSING INTO A PROTON EXCHANGE MEMBRANE IN A FUEL CELL

(71) Applicant: GM GLOBAL TECHNOLOGY OPERATIONS LLC, Detroit, MI (US)

(72) Inventors: Paul T. Yu, Lake Orion, MI (US); Craig S. Gittleman, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 17/887,791

(22) Filed: Aug. 15, 2022

(65) Prior Publication Data

US 2024/0055620 A1 Feb. 15, 2024

(51) Int. Cl.
*H01M 8/0286* (2016.01)
*H01M 4/86* (2006.01)
*H01M 4/88* (2006.01)
*H01M 8/0234* (2016.01)

(52) U.S. Cl.
CPC ....... *H01M 8/0286* (2013.01); *H01M 4/8605* (2013.01); *H01M 4/8668* (2013.01); *H01M 4/8807* (2013.01); *H01M 4/8875* (2013.01); *H01M 8/0234* (2013.01)

(58) Field of Classification Search
CPC .................................................. H01M 8/0286
See application file for complete search history.

(56) References Cited

U.S. PATENT DOCUMENTS

2014/0272659 A1* 9/2014 Lu ........................ H01M 8/1007
  429/450
2020/0280085 A1* 9/2020 Oka ..................... H01M 8/0273

FOREIGN PATENT DOCUMENTS

WO WO-2022128479 A1 * 6/2022

* cited by examiner

Primary Examiner — Brian R Ohara
(74) Attorney, Agent, or Firm — Quinn IP Law (57) ABSTRACT

A system for minimizing iron infusion in a fuel cell includes a catalyst coated on proton exchange membrane (CCM) having a plurality of side edge portions. The CCM includes a membrane having a first planar side and a second planar side, an anode on the first planar side of the membrane, and a cathode on the second planar side of the membrane. The system further includes an anode gas diffusion layer (GDL) including a first micro-porous layer. The first micro-porous layer is in contact with the anode. The system further includes a cathode GDL including a second micro-porous layer. The second micro-porous layer is in contact with the cathode. The system further includes an adhesive in contact with the plurality of side edge portions of the CCM. The first micro-porous layer, the second micro-porous layer, and the adhesive collectively encapsulate the CCM and minimize iron infusing into the membrane.

17 Claims, 4 Drawing Sheets

SYSTEM AND METHOD FOR PREVENTING IRON FROM INFUSING INTO A PROTON EXCHANGE MEMBRANE IN A FUEL CELL

INTRODUCTION

The disclosure generally relates to a system and method for preventing or minimizing iron from infusing into a proton exchange membrane in a fuel cell.

A fuel cell utilizes a flow of hydrogen gas or another fuel and a flow of oxygen to create electrical energy. A fuel cell includes at least one pair of an anode electrode and a cathode electrode separated by a proton exchange membrane (PEM). As hydrogen or another fuel is exposed to the anode and as oxygen in the form of compressed air is exposed to the cathode, an electrochemical reaction takes place. The PEM facilitates ion exchange between the anode and cathode useful for the electrochemical reaction.

SUMMARY

A system for minimizing iron infusion in a fuel cell is provided. The system includes a catalyst coated on proton exchange membrane (CCM) having a plurality of side edge portions. The CCM includes a proton exchange membrane having a first planar side and a second planar side, an anode electrode on the first planar side of the proton exchange membrane, and a cathode electrode on the second planar side of the proton exchange membrane. The system further includes an anode gas diffusion layer (GDL) including a first micro-porous layer, wherein the first micro-porous layer is disposed in contact with the anode electrode. The system further includes a cathode GDL including a second micro-porous layer, wherein the second micro-porous layer is disposed in contact with the cathode electrode. The system further includes an adhesive in contact with the plurality of side edge portions of the CCM. The first micro-porous layer, the second micro-porous layer, and the adhesive collectively encapsulate the CCM and minimize iron infusing into the proton exchange membrane.

In some embodiments, the first micro-porous layer and the second micro-porous layer are each constructed with conductive carbon particles bound together with a polymer having a hydrophobic property.

In some embodiments, the polymer is Polytetrafluoroethylene (PTFE) or Fluorinated ethylene propylene (FEP).

In some embodiments, the first micro-porous layer and the second micro-porous layer each have a pore size of from 50 nanometers to 150 nanometers.

In some embodiments, the adhesive has a thermal creeping property.

In some embodiments, the system further includes a first sub-gasket and a second sub-gasket. A portion of the adhesive is disposed between the first sub-gasket and the second sub-gasket.

In some embodiments, the first micro-porous layer is disposed in contact with a portion of one of the anode electrode or the cathode electrode. The adhesive is disposed in contact with a remaining portion of the one of the anode electrode or the cathode electrode.

According to one alternative embodiment, a system for minimizing iron infusion is provided. The system includes a device including a fuel cell configured for providing electrical energy to the device. The fuel cell includes a catalyst coated on proton exchange membrane (CCM) having a plurality of side edges. The CCM includes a proton exchange membrane having a first planar side and a second planar side, an anode electrode on the first planar side of the proton exchange membrane, and a cathode electrode on the second planar side of the proton exchange membrane. The fuel cell further includes an anode gas diffusion layer (GDL) including a first micro-porous layer, wherein the first micro-porous layer is disposed in contact with the anode electrode. The fuel cell further includes a cathode GDL including a second micro-porous layer, wherein the second micro-porous layer is disposed in contact with the cathode electrode. The fuel cell further includes an adhesive in contact with the plurality of side edge portions of the CCM. The first micro-porous layer, the second micro-porous layer, and the adhesive collectively encapsulate the CCM and minimize iron infusing into the proton exchange membrane.

In some embodiments, the first micro-porous layer and the second micro-porous layer are each constructed with conductive carbon particles bound together with a polymer having a hydrophobic property.

In some embodiments, the first micro-porous layer and the second micro-porous layer each have a pore size of from 50 nanometers to 150 nanometers.

In some embodiments, the adhesive has a thermal creeping property.

In some embodiments, the fuel cell further includes a first sub-gasket and a second sub-gasket. A portion of the adhesive is disposed between the first sub-gasket and the second sub-gasket.

In some embodiments, the first micro-porous layer is disposed in contact with a portion of one of the anode electrode or the cathode electrode. The adhesive is in contact with a remaining portion of the one of the anode electrode or the cathode electrode.

According to one alternative embodiment, a method for preventing iron from infusing into a proton exchange membrane in a fuel cell is provided. The method includes depositing a first coating upon an anode gas diffusion layer (GDL), wherein the first coating includes a first micro-porous layer. The method further includes depositing a second coating upon a cathode GDL, wherein the second coating includes a second micro-porous layer. The method further includes disposing an adhesive and a catalyst coated on proton exchange membrane (CCM) between the anode GDL and the cathode GDL. The CCM has a plurality of side edge portions and includes the proton exchange membrane having a first planar side and a second planar side. The CCM further includes an anode electrode on the first planar side of the proton exchange membrane and a cathode electrode on the second planar side of the proton exchange membrane. The method further includes applying heat and pressure to the anode GDL and the cathode GDL in a laminating process, such that the first micro-porous layer is disposed in contact with the anode electrode and the second micro-porous layer is disposed in contact with the cathode electrode. The laminating process squeezes the adhesive and presses the adhesive into contact with the plurality of side edge portions of the CCM. The method further includes collectively encapsulating the CCM with the first micro-porous layer, the second micro-porous layer, and the adhesive to thereby minimize iron infusing into the proton exchange membrane.

In some embodiments, the method further includes forming the first micro-porous layer and the second micro-porous layer with conductive carbon particles bound together with a polymer having a hydrophobic property.

In some embodiments, the polymer is Polytetrafluoroethylene (PTFE) or Fluorinated ethylene propylene (FEP).

In some embodiments, the first micro-porous layer and the second micro-porous layer each include a pore size in a range from 50 nanometers to 150 nanometers.

In some embodiments, applying the heat and the pressure decreases a viscosity of the adhesive.

In some embodiments, the method further includes situating a first sub-gasket and a second sub-gasket along the plurality of side edge portions of the CCM. A portion of the adhesive is disposed between the first sub-gasket and the second sub-gasket.

In some embodiments, the first micro-porous layer is disposed in contact with a portion of one of the anode electrode or the cathode electrode. The laminating process further presses the adhesive into contact with a remaining portion of the one of the anode electrode and the cathode electrode.

The above features and advantages and other features and advantages of the present disclosure are readily apparent from the following detailed description of the best modes for carrying out the disclosure when taken in connection with the accompanying drawings.

DETAILED DESCRIPTION

A proton exchange membrane facilitates ion transfer in a fuel cell between the anode and the cathode. The proton exchange membrane may be disposed between the anode and cathode, preventing direct contact between the anode and the cathode, while enabling ion transfer or, in the case of hydrogen gas reaction upon the anode, $H^+$ or proton transfer across the proton exchange membrane.

Fuel cell stack components may include a variety of materials. Steel may be utilized in portions of the fuel cell stack such as bipolar plates. Iron (Fe[II]) in a form of cationic ions may become present within the fuel cell stack as a result of corrosion of steel components. Free hydroxyl radicals (OH·), which attack the PEM may also be induced by a reaction described as the Fenton reaction, in which hydrogen peroxide decomposes to OH· in the presence of (Fe[II]). As a result of this free radical attack, efficiency and other factors of the PEM may be degraded.

There are two paths for iron released by plate corrosion to enter the proton exchange membrane. One path is through a gas diffusion layer (GDL). The other is via an edge of the Unitized Electrode Assembly (UEA) where the proton exchange membrane may be exposed to a bypass region.

The disclosed system and method prevent iron from infusing into the proton exchange membrane in two ways. First, the system and method include using a sub-gasket adhesive material, thickness, and lamination process that enables the adhesive to deform or project into the area between the GDL and the sub-gasket to seal the edge of the UEA and proton exchange membrane during and as a result of a lamination process. Second, the disclosed system and method include disposing a micro-porous layer (MPL) in between the GDL and catalyst coated on proton exchange membrane (CCM) to block the iron transport path into the proton exchange membrane.

The disclosed system includes a catalyst coated on proton exchange membrane (CCM) having a plurality of side edge portions. The CCM includes a proton exchange membrane having a first planar side and a second planar side, an anode electrode on the first planar side of the proton exchange membrane, and a cathode electrode on the second planar side of the proton exchange membrane. The system further includes an anode gas diffusion layer (GDL) including a first micro-porous layer, wherein the first micro-porous layer is disposed in contact with the anode electrode. The system further includes a cathode GDL including a second micro-porous layer, wherein the second micro-porous layer is disposed in contact with the cathode electrode. The system further includes an adhesive in contact with the plurality of side edge portions of the CCM. The first micro-porous layer, the second micro-porous layer, and the adhesive collectively encapsulate the CCM and minimize iron infusing into the proton exchange membrane.

In one embodiment, the system includes diffusion media (DM), the MPL, and the CCM with at least one sub-gasket and an adhesive material. The adhesive material has a thermal creeping property that may be utilized to cover the edge area. An adhesive material with a thermal creeping property exhibits decreased viscosity as the adhesive is heated over an average room temperature. In one embodiment, the adhesive may be stable or relatively highly viscous at room temperature, and, when heated to temperatures utilized in a lamination process, the adhesive may decrease viscosity to a degree that the adhesive may flow into recesses in the disclosed system in response to compressive forces applied to the system during the lamination process. The adhesive material does not allow iron infusion. The MPL includes conductive carbon particles bound with a polymer having a hydrophobic property such as Polytetrafluoroethylene (PTFE) or Fluorinated ethylene propylene (FEP). In one embodiment, the MPL has a pore size of from 50 nanometers to 150 nanometers, e.g., of from 75 nanometers to 125 nanometers, or from 90 nanometers to 110 nanometers, or 100 nanometers.

The disclosed system and method may improve proton exchange membrane lifetime and fuel cell durability for heavy duty truck or commercial truck applications.

The first micro-porous layer and the second micro-porous layer may each constructed with conductive carbon particles bound together with a polymer having a hydrophobic property. The polymer may be Polytetrafluoroethylene (PTFE) or Fluorinated ethylene propylene (FEP).

The first micro-porous layer and the second micro-porous layer may each have a pore size of from 50 nanometers to 150 nanometers.

The adhesive may have a thermal creeping property.

The disclosed system may further include a first sub-gasket and a second sub-gasket. A portion of the adhesive may be disposed between the first sub-gasket and the second sub-gasket.

The first micro-porous layer may be disposed in contact with a portion of one of the anode electrode or the cathode electrode. The adhesive may disposed in contact with a remaining portion of the one of the anode electrode or the cathode electrode.

Figure 1:
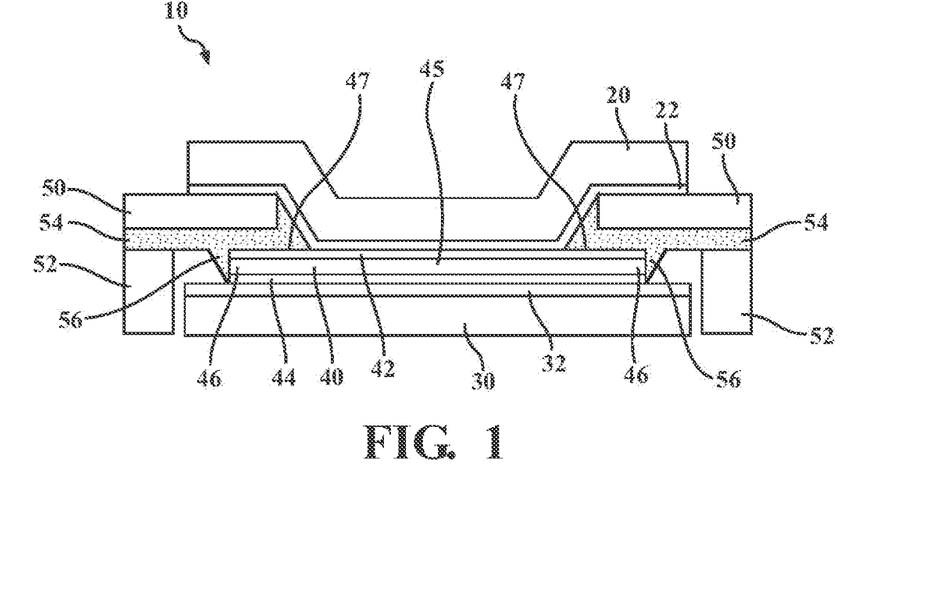
FIG. 1 schematically illustrates a system for preventing iron from infusing into a proton exchange membrane in a fuel cell, in accordance with the present disclosure.

Referring now to the drawings, wherein like reference numbers refer to like features throughout the several views, FIG. 1 schematically illustrates a system 10 for preventing iron from infusing into a proton exchange membrane 40 in a fuel cell. The system 10 includes an anode gas diffusion layer (GDL) 20, a cathode GDL 30, and the proton exchange membrane 40. Both anode GDL 20 and cathode GDL 30 are configured for hydrogen and air diffusion into the CCM 45, respectively, and for liquid water transporting out from the CCM 45 to a flow channel. The proton exchange membrane 40 is a planar piece of material with flat or planar top and bottom faces and a plurality of side edge portions 46. An anode 42 and a cathode 44 are illustrated coated upon the flat top and flat bottom faces of the proton exchange membrane 40, respectively. The anode 42 may be described as an anode electrode, and the cathode 44 may be described as a cathode electrode. The anode 42, the cathode 44, and the proton exchange membrane 40 may be collectively described as the CCM 45.

An electrolyte is provided within system 10, providing an exchange medium through which protons may travel from the anode 42 to the cathode 44. Over time, iron from corrosion of fuel stack components may enter the electrolyte solution and pose a degradation risk to the proton exchange membrane 40.

A first micro-porous layer 22 is disposed upon the anode GDL 20. A second micro-porous layer 32 is disposed upon the cathode GDL 30. The micro-porous layers 22 and 32 include conductive carbon particles binding with a polymer with a hydrophobic property. In one embodiment, the micro-porous layers 22 and 32 have a pore size of from 50 nanometers to 150 nanometers, e.g., of from 75 nanometers to 125 nanometers, or from 90 nanometers to 110 nanometers, or 100 nanometers. The micro-porous layers 22 and 32 are each configured for expelling water vapor that generates from the anode 42 and the cathode 44 to pass through the anode GDL 20 and the cathode GDL 30, respectively. The pore size and the hydro-phobic properties of the micro-porous layers 22 and 32 prevent iron dissolved in liquid water from passing through the micro-porous layers 22 and 32. In areas where the micro-porous layer 22 contacts the anode 42 of the CCM 45, the micro-porous layer 22 prevents iron released by corrosion of the bipolar plate or other iron containing components in the fuel cell stack from coming into contact with the CCM 45. In areas where the micro-porous layer 32 contacts the cathode 44, the micro-porous layer 32 prevents iron released by corrosion of the bipolar plate or other iron containing components in the fuel cell stack from coming into contact with the CCM 45.

The system 10 may also include sub-gaskets 50 and 52. The sub-gaskets 50 and 52 are illustrated disposed in close proximity to the anode GDL 20, the cathode GDL 30, and the CCM 45. The sub-gaskets are designed to anchor and to seal the CCM 45 between two bipolar plates (BPP) which contain or encase the system 10 from above and below the illustrated system 10. An adhesive 54 is disposed between the sub-gaskets 50 and 52. The sub-gasket 50 and the adhesive 54 are illustrated disposed between micro-porous layer 22 of the anode GDL 20 and the CCM 45. The adhesive 54 is at least initially at a time of installation provided as a viscous liquid or a paste. During a lamination process where heat and pressure are used to press the anode GDL 20 against the CCM 45, the adhesive is squeezed between the sub-gasket 50, the micro-porous layer 22 of anode GDL 20, and the CCM 45, such that the adhesive 54 deforms and is pressed into close contact with the CCM 45 and the micro-porous layer 22 of the anode GDL 20. The adhesive 54 contacts and forms a seal against portions 47 of the anode 42 not in contact with the micro-porous layer 22. The adhesive 54 further deforms into adhesive portion 56 which contacts and forms a seal against edge portions 46 of the proton exchange membrane 40. The adhesive 54 is impervious to iron or prevents iron released by corrosion of the bipolar plate or other iron containing components in the fuel cell stack from coming into contact with the proton exchange membrane 40. By sealing portions of the CCM 45 not in contact with the micro-porous layers 22 and 32, the adhesive 54 prevents iron from contacting the proton exchange membrane 40.

The combination of the micro-porous layers 22 and 32 and the adhesive 54 collectively encapsulate the CCM 45. Both the micro-porous layers 22 and 32 and the adhesive 54 prevent iron released by corrosion of the bipolar plate or other iron containing components in the fuel cell stack of system 10 from passing therethrough, and therefore prevent the iron from contacting and degrading the proton exchange membrane 40 of the CCM 45.

In one embodiment, the micro-porous layer 22 may cover or contact an entirety of the exposed flat surface of the anode 42 of the CCM 45. In the embodiment of FIG. 1, the portion the of micro-porous layer 22 in contact with the CCM 45 is narrower than a total width of the CCM 45, such that a portion of the planar face is covered by the micro-porous layer 22 and a portion of the planar face is not covered by the micro-porous layer 22. Adhesive 54 is utilized to cover the portion of the planar face that is not covered by the micro-porous layer 22. In an alternative embodiment, the position of the anode 42 and the cathode 44 and the corresponding GDL layers 20 and 30 may be reversed, such that the micro-porous layer 32 may contact/cover only a portion of the planar surface of the cathode 44, and the adhesive 54 may cover the remainder portion of the planar face that is not covered by the micro-porous layer 32.

Sub-gaskets 50 and 52 are exemplary. One sub-gasket 50 or 52 may be utilized or more than two sub-gaskets 50, 52 may be utilized. In one embodiment, no sub-gasket 50, 52 is present.

Figure 2:
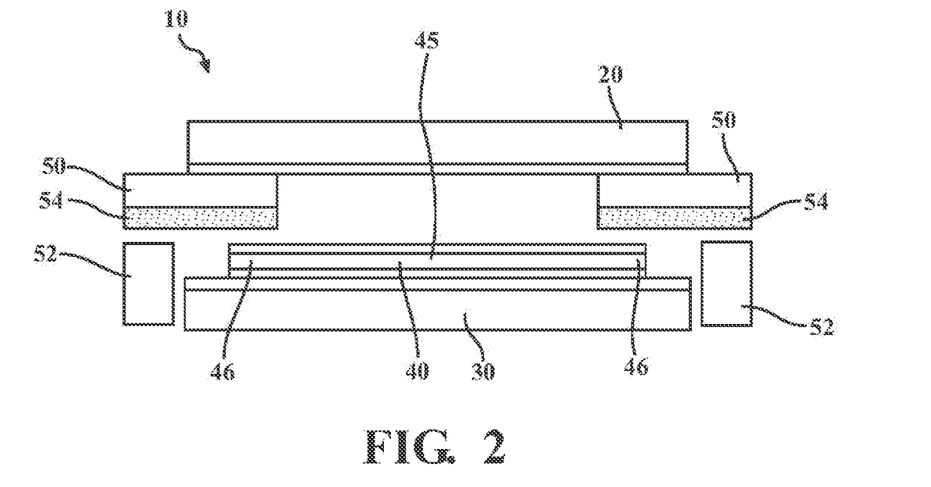
FIG. 2 schematically illustrates the system of FIG. 1 prior to a lamination process, in accordance with the present disclosure.

FIG. 2 schematically illustrates the system 10 of FIG. 1 prior to the lamination process. The anode GDL 20 is illustrated distinct from the combination of the cathode GDL 30 and the CCM 45. The sub-gaskets 50 and the adhesive 54 coated thereupon and the initially separate sub-gaskets 52 are illustrated disposed between the anode GDL 20 and the combination of the cathode GDL 30 and the CCM 45. As the lamination process is executed, heat and pressure are used to press the anode GDL 20 against the combination of the cathode GDL 30 and the CCM 45 as is illustrated in FIG. 1. As a result of that process, the adhesive 54 contacts and adheres to the sub-gaskets 52 and the adhesive 54 is squeezed and deformed into spaces left between the anode GDL 20 including the micro-porous layer 22, the cathode GDL 30 including the micro-porous layer 32, and the CCM 45. The adhesive 54 covers edge portions 46 of the proton exchange membrane 40. As a result of the lamination process, the CCM 45 is encapsulated between the micro-porous layers 22, 32 of the anode GDL 20 and the cathode GDL 30 and by the adhesive 54, such that iron released by corrosion of the bipolar plate or other iron containing components in the fuel cell stack of the system 10 cannot contact the proton exchange membrane 40.

Figure 3:
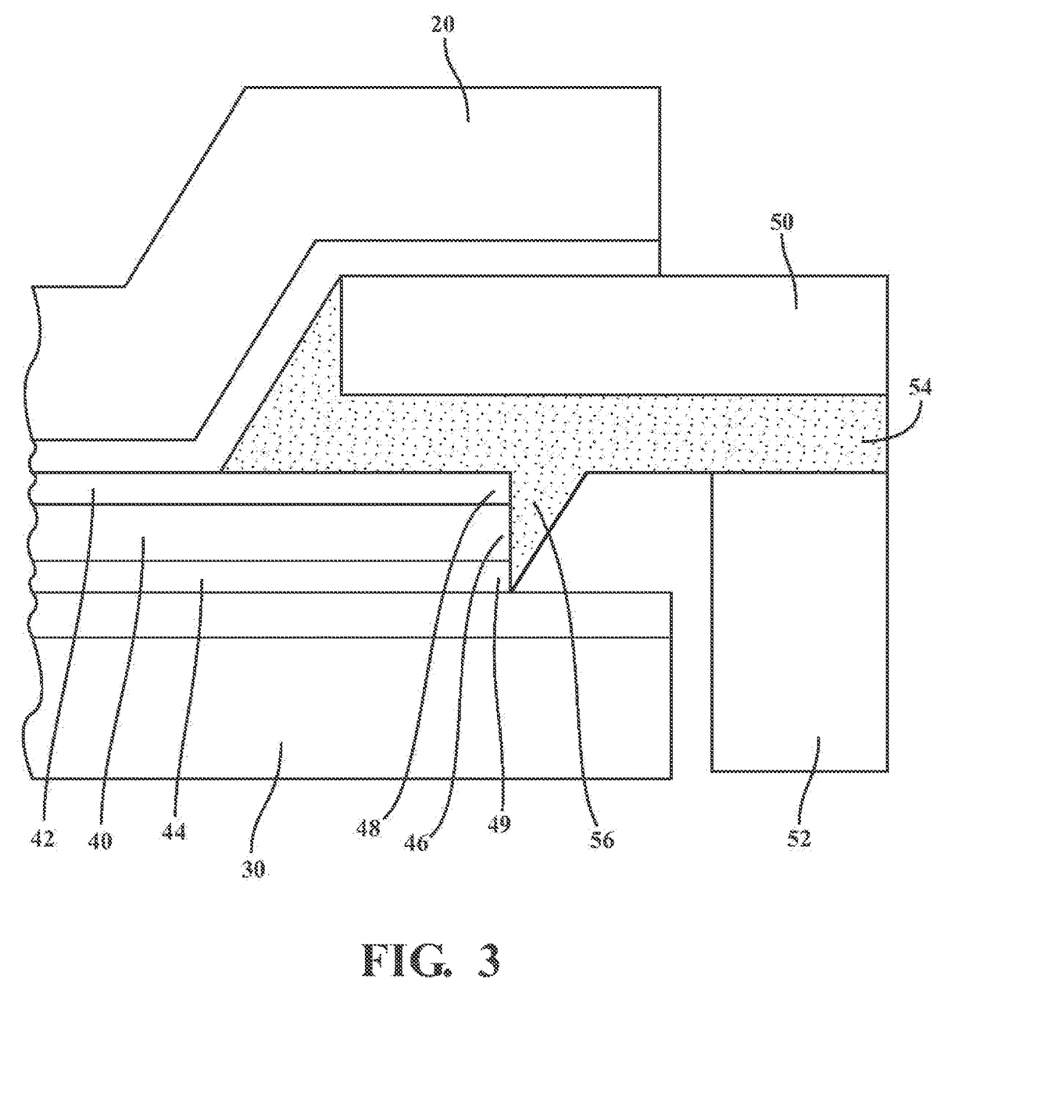
FIG. 3 schematically illustrates the system of FIG. 1 in magnified scale, in accordance with the present disclosure.

FIG. 3 schematically illustrates the system 10 of FIG. 1 in magnified scale. The system 10 of FIG. 1 is illustrated including the anode GDL 20, the cathode GDL 30, and the proton exchange membrane 40. The anode 42 and the cathode 44 are illustrated coated upon the flat top and flat bottom faces of the proton exchange membrane 40, respectively. A plurality of side edge portions 46, 48, and 49 of the proton exchange membrane 40, the anode 42, and the cathode 44 are illustrated, respectively. The sub-gaskets 50 and 52 are illustrated, including the adhesive 54 disposed therebetween. The adhesive 54 is further illustrated deformed and sealing against the side edge portion 46 of the proton exchange membrane 40, the side edge portions 48 and 49 of the anode 42 and the cathode 44, respectively, and the micro-porous layer of the anode GDL 20.

Figure 4:
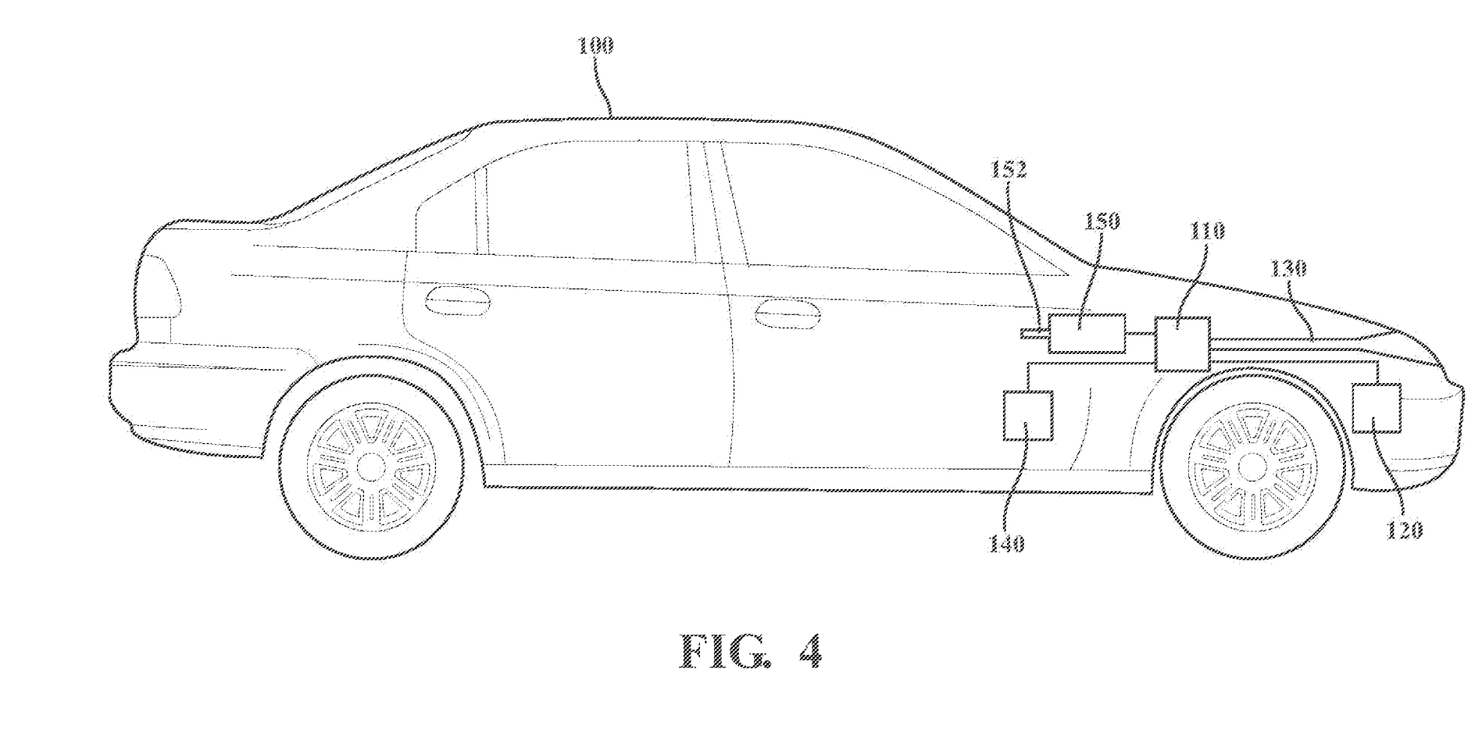
FIG. 4 schematically illustrates a device embodied as a vehicle including a fuel cell stack including the system of FIG. 1, in accordance with the present disclosure.

FIG. 4 schematically illustrates a device 100 embodied as a vehicle including a fuel cell stack 110 including the system 10 of FIG. 1. The device 100 is illustrated including the fuel cell stack 110, a hydrogen fuel storage tank 120, an air intake manifold 130, a battery 140, and an electric machine 150 configured for utilizing electrical energy to provide an output torque to an output component 152. The fuel cell stack 110 may include a plurality of the systems 10 of FIG. 1, repeatedly stacked within the fuel cell stack 110. The fuel cell stack 110 may include one or more steel components useful to provide structure and rigidity to the fuel cell stack 110. Fuel cell stack 110 receives a flow of hydrogen or other fuel gas from the hydrogen fuel storage tank 120 and receives a flow of air including oxygen gas from air intake manifold 130. The fuel cell stack 110 may include an air compressor device useful to pressurize the air to a desired pressure. The fuel cell stack 110 may provide electrical energy directly to the electric machine 150 and/or the fuel cell stack 110 may provide electrical energy to the battery 140 for storage and later use. The output component 152 may provide the output torque for usage, for example, to provide a motive force to the device 100. The device 100 may take other embodiments, such as a power generation unit, a boat, or other similar device.

According to one alternative embodiment of the disclosed system, the system includes a device including a fuel cell configured for providing electrical energy to the device. The fuel cell includes a catalyst coated on proton exchange membrane (CCM) having a plurality of side edges. The CCM includes a proton exchange membrane having a first planar side and a second planar side, an anode electrode on the first planar side of the proton exchange membrane, and a cathode electrode on the second planar side of the proton exchange membrane. The fuel cell further includes an anode gas diffusion layer (GDL) including a first micro-porous layer, wherein the first micro-porous layer is disposed in contact with the anode electrode. The fuel cell further includes a cathode GDL including a second micro-porous layer, wherein the second micro-porous layer is disposed in contact with the cathode electrode. The fuel cell further includes an adhesive in contact with the plurality of side edge portions of the CCM. The first micro-porous layer, the second micro-porous layer, and the adhesive collectively encapsulate the CCM and minimize iron infusing into the proton exchange membrane.

The first micro-porous layer and the second micro-porous layer may each be constructed with conductive carbon particles bound together with a polymer having a hydrophobic property.

The first micro-porous layer and the second micro-porous layer may each have a pore size of from 50 nanometers to 150 nanometers.

The adhesive may have a thermal creeping property.

The fuel cell further may include a first sub-gasket and a second sub-gasket. A portion of the adhesive may be disposed between the first sub-gasket and the second sub-gasket.

The first micro-porous layer may be disposed in contact with a portion of one of the anode electrode or the cathode electrode. The adhesive may be in contact with a remaining portion of the one of the anode electrode or the cathode electrode.

Figure 5:
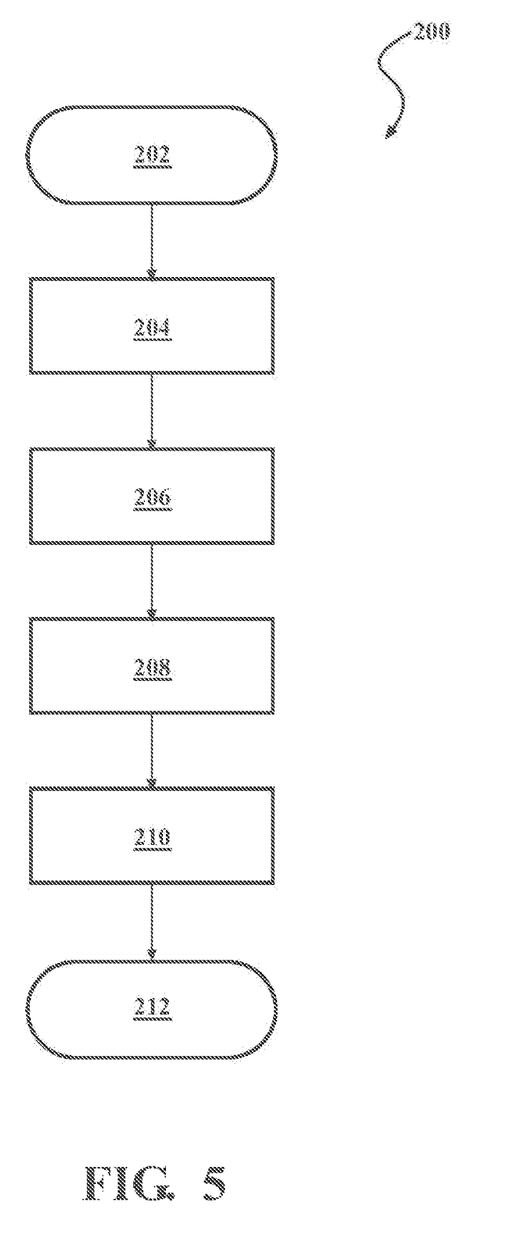
FIG. 5 is a flowchart illustrating a method for preventing iron from infusing into a proton exchange membrane in a fuel cell, in accordance with the present disclosure.

FIG. 5 is a flowchart illustrating a method 200 for preventing iron from infusing into a proton exchange membrane 40 in a fuel cell stack 110. Method 200 is described in relation to components of the system 10 of FIG. 1 and the fuel cell stack of FIG. 4, although the physical components utilized in method 200 may include alternative embodiments. The method 200 starts at step 202. At step 204, the anode GDL 20 of FIG. 1 is provided with the micro-porous layer 22, the cathode GDL 30 of FIG. 1 is provided with the micro-porous layer 32, and the proton exchange membrane 40 is placed between the anode 42 and the cathode 44. At step 206, the anode GDL 20, the cathode GDL 30, the CCM 45, the sub-gaskets 50 including the adhesive 54, and the initially separate sub-gaskets 52 are aligned in preparation for a lamination process. At step 208, heat and pressure are applied to the aligned components, and the components are laminated together. As a result of this lamination process, the adhesive 54 is squeezed and pressed into recesses or cavities between the components. As a result of the lamination process, a portion of the CCM 45 is covered with micro-porous material, and a remaining or remainder portion of the CCM 45 is coated with or covered with the adhesive 54. At step 210, a fuel cell stack 110 of FIG. 3 is created including a plurality of iterations of the system 10, each including a pair of the anode 42 and the cathode 44, into the fuel cell stack 110 to facilitate ion or proton transfer within the fuel cell stack 110 between the anode 42 and cathode 44 pairs. The method 200 ends at the step 212. The method 200 is provided as an exemplary method for preventing iron from infusing into a proton exchange membrane 40 in a fuel cell stack 110. Additional or alternative method steps may be employed, and the disclosure is not intended to be limited to the examples provided herein.

The disclosed method includes depositing a first coating upon an anode gas diffusion layer (GDL), wherein the first coating includes a first micro-porous layer. The method further includes depositing a second coating upon a cathode GDL, wherein the second coating includes a second micro-porous layer. The method further includes disposing an adhesive and a catalyst coated on proton exchange membrane (CCM) between the anode GDL and the cathode GDL. The CCM has a plurality of side edge portions and includes the proton exchange membrane having a first planar side and a second planar side. The CCM further includes an anode electrode on the first planar side of the proton exchange membrane and a cathode electrode on the second planar side of the proton exchange membrane. The method further includes applying heat and pressure to the anode GDL and the cathode GDL in a laminating process, such that the first micro-porous layer is disposed in contact with the anode electrode and the second micro-porous layer is disposed in contact with the cathode electrode. The laminating process squeezes the adhesive and presses the adhesive into contact with the plurality of side edge portions of the CCM. The method further includes collectively encapsulating the CCM with the first micro-porous layer, the second micro-porous layer, and the adhesive to thereby minimize iron infusing into the proton exchange membrane.

The method further may include forming the first micro-porous layer and the second micro-porous layer with conductive carbon particles bound together with a polymer having a hydrophobic property.

The polymer may include Polytetrafluoroethylene (PTFE) or Fluorinated ethylene propylene (FEP).

The first micro-porous layer and the second micro-porous layer may each include a pore size in a range from 50 nanometers to 150 nanometers.

Applying the heat and the pressure may decrease a viscosity of the adhesive.

The method may further include situating a first sub-gasket and a second sub-gasket along the plurality of side edge portions of the CCM. A portion of the adhesive may be disposed between the first sub-gasket and the second sub-gasket.

The first micro-porous layer may be disposed in contact with a portion of one of the anode electrode or the cathode electrode. The laminating process may further press the adhesive into contact with a remaining portion of the one of the anode electrode or the cathode electrode.

While the best modes for carrying out the disclosure have been described in detail, those familiar with the art to which this disclosure relates will recognize various alternative designs and embodiments for practicing the disclosure within the scope of the appended claims.

What is claimed is:

1. A system for minimizing iron infusion in a fuel cell, the system comprising:
   a catalyst coated on proton exchange membrane (CCM) having a plurality of side edge portions and including:
     a proton exchange membrane having a first planar side and a second planar side;
     an anode electrode on the first planar side of the proton exchange membrane; and
     a cathode electrode on the second planar side of the proton exchange membrane;
   an anode gas diffusion layer (GDL) including a first micro-porous layer, wherein the first micro-porous layer is disposed in contact with the anode electrode;
   a cathode GDL including a second micro-porous layer, wherein the second micro-porous layer is disposed in contact with the cathode electrode;
   a first sub-gasket disposed in contact with the first micro-porous layer; and
   an adhesive in contact with the plurality of side edge portions of the CCM;
   wherein the anode electrode has a planar surface configured for contacting the first micro-porous layer and the adhesive,
   wherein a first portion of the planar surface is disposed in contact with the first micro-porous layer and a remaining portion of the planar surface is not disposed in contact with the first micro-porous layer and is disposed in contact with the adhesive; and
   wherein the first micro-porous layer, the second micro-porous layer, and the adhesive collectively encapsulate the CCM and minimize iron infusing into the proton exchange membrane.

2. The system of claim 1, wherein the first micro-porous layer and the second micro-porous layer are each constructed with conductive carbon particles bound together with a polymer having a hydrophobic property.

3. The system of claim 2, wherein the polymer is Polytetrafluoroethylene (PTFE) or Fluorinated ethylene propylene (FEP).

4. The system of claim 2, wherein the first micro-porous layer and the second micro-porous layer each have a pore size of from 50 nanometers to 150 nanometers.

5. The system of claim 1, wherein the adhesive has a thermal creeping property.

6. The system of claim 1
   a second sub-gasket; and
   wherein a portion of the adhesive is disposed between and in contact with the first sub-gasket and the second sub-gasket.

7. A system for minimizing iron infusion, the system comprising:
   a device, including:
     a fuel cell configured for providing electrical energy to the device and including:
       a catalyst coated on proton exchange membrane (CCM) having a plurality of side edges and including:
         a proton exchange membrane having a first planar side and a second planar side;
         an anode electrode on the first planar side of the proton exchange membrane; and
         a cathode electrode on the second planar side of the proton exchange membrane; and
       an anode gas diffusion layer (GDL) including a first micro-porous layer, wherein the first micro-porous layer is disposed in contact with the anode electrode;
       a cathode GDL including a second micro-porous layer, wherein the second micro-porous layer is disposed in contact with the cathode electrode;
       a first sub-gasket disposed in contact with the first micro-porous layer; and
       an adhesive in contact with the plurality of side edge portions of the CCM;
       wherein the anode electrode has a planar surface configured for contacting the first micro-porous layer and the adhesive,
       wherein a first portion of the planar surface is disposed in contact with the first micro-porous layer and a remaining portion of the planar surface is not disposed in contact with the first micro-porous layer and is disposed in contact with the adhesive; and
       wherein the first micro-porous layer, the second micro-porous layer, and the adhesive collectively encapsulate the CCM and minimize iron infusing into the proton exchange membrane.

8. The system of claim 7, wherein the first micro-porous layer and the second micro-porous layer are each constructed with conductive carbon particles bound together with a polymer having a hydrophobic property.

9. The system of claim 8, wherein the first micro-porous layer and the second micro-porous layer each have a pore size of from 50 nanometers to 150 nanometers.

10. The system of claim 7, wherein the adhesive has a thermal creeping property.

11. The system of claim 7, wherein the fuel cell further includes:
    a second sub-gasket; and
    wherein a portion of the adhesive is disposed between the first sub-gasket and the second sub-gasket.

12. A method for preventing iron from infusing into a proton exchange membrane in a fuel cell, the method comprising:

depositing a first coating upon an anode gas diffusion layer (GDL), wherein the first coating includes a first micro-porous layer;

disposing a first sub-gasket in contact with the first micro-porous layer;

depositing a second coating upon a cathode GDL, wherein the second coating includes a second micro-porous layer;

disposing an adhesive and a catalyst coated on proton exchange membrane (CCM) between the anode GDL and the cathode GDL, wherein the CCM has a plurality of side edge portions and includes:

the proton exchange membrane having a first planar side and a second planar side, an anode electrode on the first planar side of the proton exchange membrane, and a cathode electrode on the second planar side of the proton exchange membrane; and applying heat and pressure to the anode GDL and the cathode GDL in a laminating process, such that the first micro-porous layer is disposed in contact with a first portion of a planar surface of the anode electrode, the first micro-porous layer is not disposed in contact with a remaining portion of the planar surface, the remaining portion of the planar surface is disposed in contact with the adhesive, and the second micro-porous layer is disposed in contact with the cathode electrode, wherein the laminating process squeezes the adhesive and presses the adhesive into contact with the plurality of side edge portions of the CCM; and collectively encapsulating the CCM with the first micro-porous layer, the second micro-porous layer, and the adhesive to thereby minimize iron infusing into the proton exchange membrane.

13. The method of claim 12, further including forming the first micro-porous layer and the second micro-porous layer with conductive carbon particles bound together with a polymer having a hydrophobic property.

14. The method of claim 13, wherein the polymer is Polytetrafluoroethylene (PTFE) or Fluorinated ethylene propylene (FEP).

15. The method of claim 13, wherein the first micro-porous layer and the second micro-porous layer each include a pore size in a range from 50 nanometers to 150 nanometers.

16. The method of claim 12, wherein applying the heat and the pressure decreases a viscosity of the adhesive.

17. The method of claim 12, further comprising:

situating a second sub-gasket along the plurality of side edge portions of the CCM; and wherein a portion of the adhesive is disposed between the first sub-gasket and the second sub-gasket.

* * * * *